United States Patent
Wang

(10) Patent No.: US 9,696,569 B2
(45) Date of Patent: Jul. 4, 2017

(54) DRIVING APPARATUS OF A DISPLAY PANEL AND DISPLAY APPARATUS

(71) Applicants: BOE TECHNOLOGY GROUP CO., LTD., Beijing (CN); BEIJING BOE DISPLAY TECHNOLOGY CO., LTD., Beijing (CN)

(72) Inventor: Jieqiong Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

(*) Notice: Subject to any disclaimer, the term of this patent is extended or adjusted under 35 U.S.C. 154(b) by 150 days.

(21) Appl. No.: 14/517,232

(22) Filed: Oct. 17, 2014

(65) Prior Publication Data

US 2015/0355488 A1 Dec. 10, 2015

(30) Foreign Application Priority Data

Jun. 9, 2014 (CN) .......................... 2014 1 0253986

(51) Int. Cl.
*G09G 3/32* (2016.01)
*G02F 1/133* (2006.01)
(Continued)

(52) U.S. Cl.
CPC ....... *G02F 1/13306* (2013.01); *G09G 3/3233* (2013.01); *G09G 3/3614* (2013.01);
(Continued)

(58) Field of Classification Search
CPC .. G09G 3/36; G09G 2330/045; G09G 3/3614; G09G 3/3648; G09G 2330/021;
(Continued)

(56) References Cited

U.S. PATENT DOCUMENTS

| | | | |
|---|---|---|---|
| 6,590,555 B2* | 7/2003 | Su | G09G 3/3614 345/101 |
| 2008/0189565 A1* | 8/2008 | Sheng | G06F 1/263 713/300 |
| 2012/0306553 A1* | 12/2012 | Kim | G04F 10/005 327/158 |

FOREIGN PATENT DOCUMENTS

| | | |
|---|---|---|
| CN | 101350185 A | 1/2009 |
| CN | 103366707 A | 10/2013 |

(Continued)

OTHER PUBLICATIONS

First Chinese Office Action for Chinese Patent Application No. 201410253986.3, dated Dec. 22, 2015.

*Primary Examiner* — Tony N Ngo
(74) *Attorney, Agent, or Firm* — Kinney & Lange, P.A.

(57) ABSTRACT

The present disclosure discloses a driving apparatus of a display panel and a display apparatus. A temperature detection module for detecting a temperature of the switching power supply is provided, so that when the temperature of the switching power supply is larger than or equal to a preset temperature value, the temperature detection module may feed back to the clock controller a first control signal. The clock controller may switch a polarity inversion mode of displaying an image on the display panel according to the received first control signal, i.e., switching the polarity inversion mode from the first polarity inversion mode with a large power consumption into a second polarity inversion mode with a small power consumption, thereby reducing the power consumption of the switching power supply and thus reducing the temperature of the switching power supply.

9 Claims, 4 Drawing Sheets

(51) Int. Cl.
*G09G 3/3233* (2016.01)
*G09G 3/36* (2006.01)

(52) U.S. Cl.
CPC ... *G09G 3/3648* (2013.01); *G09G 2300/0876* (2013.01); *G09G 2310/08* (2013.01); *G09G 2320/041* (2013.01); *G09G 2320/062* (2013.01); *G09G 2330/021* (2013.01); *G09G 2330/045* (2013.01); *G09G 2360/16* (2013.01)

(58) Field of Classification Search
CPC ..... G09G 2320/0252; G09G 2320/041; H02H 6/00
See application file for complete search history.

(56) References Cited

FOREIGN PATENT DOCUMENTS

| | | |
|---|---|---|
| CN | 103714786 A | 4/2014 |
| JP | 2013134278 A | 7/2013 |

* cited by examiner

DRIVING APPARATUS OF A DISPLAY PANEL AND DISPLAY APPARATUS

PRIORITY

This application claims the benefit under 35 U.S.C. §119(a) of a Chinese patent application filed in the Sino Intellectual Property Office on Jun. 9, 2014 and assigned Ser. No. 201410253986.3, the entire disclosure of which are hereby incorporated by reference.

TECHNICAL FIELD

The present disclosure relates to a display technology, and more particularly, to a driving apparatus of a display panel and a display apparatus.

BACKGROUND

Liquid crystal displays have currently become a major technology due to advantages such as a low power consumption, a low driving voltage, being easy to drive, direct driving of an available large scale integrated circuit, a simple structure etc.

As shown in FIG. 1, a conventional liquid crystal display generally includes a liquid crystal display panel 01, a source driver 02, a gate driver 03, an interface connector 04, a switching power supply (DC/DC) 05 and a clock controller 06. The clock controller 06 is configured to convert a digital video image signal (LVDS) output by the interface connector into a ClocK control Horizontally (CKH) signal, a Synchronizing Time Horizontally (STH) signal, a Reduced Swing Differential Signal (RSDS) and a POLarity inversion control signal (POL) etc. required for operation of the source driver 02 and control a polarity inversion mode of an image displayed on the liquid crystal display panel 01. The switching power supply 05 is configured to convert a unconverted power supply voltage (VDD) output by the interface connector 04 into various voltages complying with respective operation requirements of the clock controller 06. The liquid crystal display panel 01 and the above various components cooperate with each other to implement display of image.

With a development of the liquid crystal display technology, a load of the liquid crystal display becomes larger. A conventional switching power supply may possibly have a higher temperature or even be damaged due to overload. Especially when a complex picture is displayed, the liquid crystal display will have a very large load, and both operating current and power consumption of the switching power supply are large under a heavy load at this time, thereby resulting in the switching power supply having a higher temperature or even being damaged due to the higher temperature.

SUMMARY

Embodiments of the present disclosure provide a driving apparatus of a display panel and a display apparatus, to avoid the problem that the switching power supply is damaged due to a large load of the display apparatus.

The embodiments of the present disclosure provide a driving apparatus of a display panel, comprising:

a clock controller configured to control a polarity inversion mode of displaying an image on the display panel;

a switching power supply configured to supply power to the clock controller; and a temperature detection module electrically connected to the clock controller and configured to detect a temperature of the switching power supply and compare the detected temperature of the switching power supply with a preset temperature value, and when the detected temperature of the switching power supply is larger than or equal to the preset temperature value, to transmit a first control signal to the clock controller;

wherein the clock controller is further configured to receive the first control signal, and switch the polarity inversion mode of displaying the image on the display panel from a first polarity inversion mode to a second polarity inversion mode according to the received first control signal, wherein a power consumption of the switching power supply in the second polarity inversion mode is smaller than a power consumption of the switching power supply in the first polarity inversion mode.

According to the above driving apparatus of the embodiments of the present disclosure, a temperature detection module is provided for detecting a temperature of the switching power supply, and the temperature of the switching power supply can be monitored by the driving apparatus in real time. When the temperature of the switching power supply is larger than or equal to the preset temperature value, the temperature detection module may feed back to the clock controller a first control signal indicating that the temperature of the switching power supply is larger than or equal to the preset temperature value. The clock controller may switch the polarity inversion mode of is displaying the image on the display panel according to the received first control signal, i.e., switching the polarity inversion mode of displaying image on the display panel from the first polarity inversion mode with a large power consumption into a second polarity inversion mode with a small power consumption, thereby reducing the power consumption of the switching power supply and thus reducing the temperature of the switching power supply.

Preferably, the temperature detection module is further configured to transmit a second control signal to the clock controller when the detected temperature of the switching power supply is smaller than the preset temperature value; and the clock controller is further configured to receive the second control signal, and enable the polarity inversion mode of displaying the image on the display panel to become the first polarity inversion mode.

Preferably, the clock controller is further configured to:

determine whether the polarity inversion mode of displaying the image on the display panel is the first polarity inversion mode after receiving the second control signal; and if so, maintain the polarity inversion mode of displaying image on the display panel to be the first polarity inversion mode;

otherwise, switch the polarity inversion mode of displaying the image on the display panel to the first polarity inversion mode.

Preferably, the temperature detection module is integrated with the switching power supply.

Preferably, the temperature detection module comprises:

a thermistor configured to detect the temperature of the switching power supply;

a resistor unit;

a P type transistor;

an N type transistor;

a first voltage input terminal;

a second voltage input terminal;

a third voltage input terminal;

a fourth voltage input terminal; and a control signal output terminal connected to the clock controller; wherein, a first terminal of the thermistor is connected to the first voltage input terminal, a second terminal of the thermistor is connected to a first terminal of the resistor unit, a gate electrode of the P type transistor and a gate electrode of the N type transistor respectively; and a second terminal of the resistor unit is connected to the second voltage input terminal;

a source electrode of the N type transistor is connected to the third voltage input terminal, a drain electrode of the N type transistor is connected to the control signal output terminal and a drain electrode of the P type transistor; and a source electrode of the P type transistor is connected to the fourth voltage input terminal;

there is a voltage difference between the first voltage input terminal and the second voltage input terminal, and there is a voltage difference between the third voltage input terminal and the fourth voltage input terminal; and when the temperature of the switching power supply detected by the thermistor is larger than or equal to the preset temperature value, a resistance value of the thermistor is larger than or equal to a preset resistance value, and then the control signal output terminal outputs a first control signal; and when the temperature of the switching power supply detected by the thermistor is smaller than the preset temperature value, the resistance value of the thermistor is smaller than the preset resistance value, and then the control signal output terminal outputs a second control signal.

Preferably, the second voltage input terminal and/or the third voltage input terminal is connected to the ground.

Preferably, the first voltage input terminal and/or the fourth voltage input terminal is connected to the ground.

The embodiments of the present disclosure provide a display apparatus comprising a display panel and the driving apparatus of the display panel according to the embodiments of the present disclosure.

Preferably, in the above display apparatus according to the embodiments of the present disclosure, the display panel is a liquid crystal display panel or an organic electroluminescent display panel.

BRIEF DESCRIPTION OF THE DRAWINGS

FIG. 3a illustrates a diagram of a polarity inversion mode of 1+2dot;

FIG. 3b illustrates a diagram of a polarity inversion mode of column inversion;

DETAILED DESCRIPTION OF THE EMBODIMENTS

Specific implementations of a driving apparatus of a display panel and a display apparatus according to embodiments of the present disclosure will be described in detail below with reference to drawings.

Figure 1:
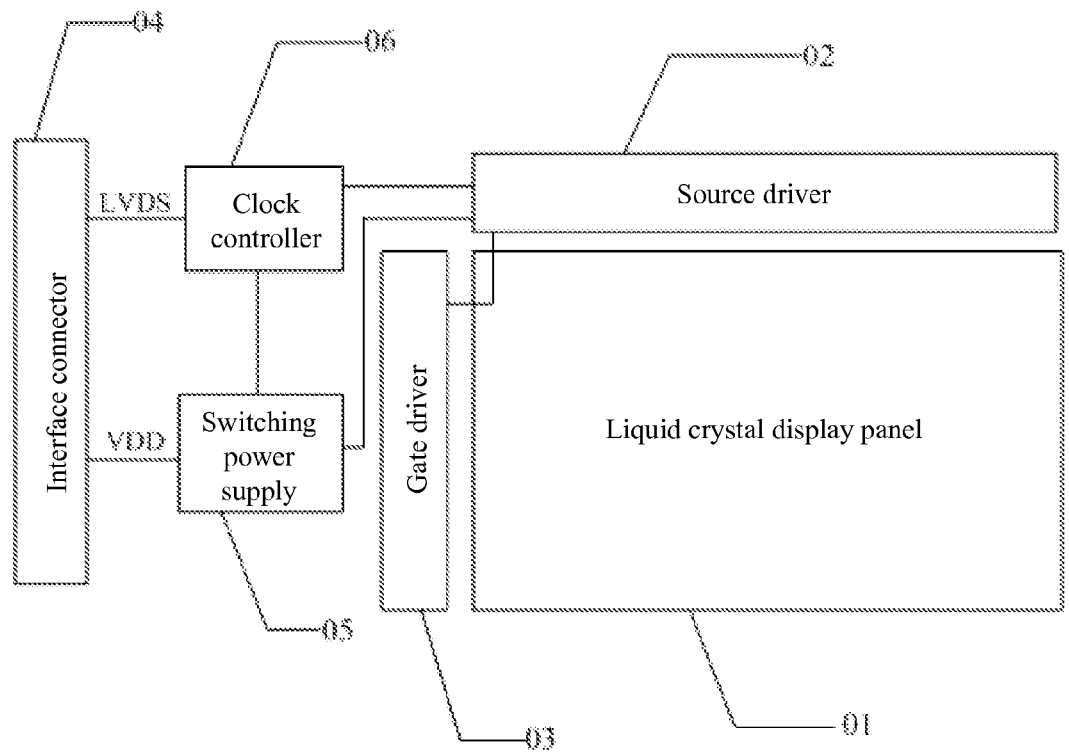
FIG. 1 illustrates a structural diagram of a conventional liquid crystal display.
Figure 2:
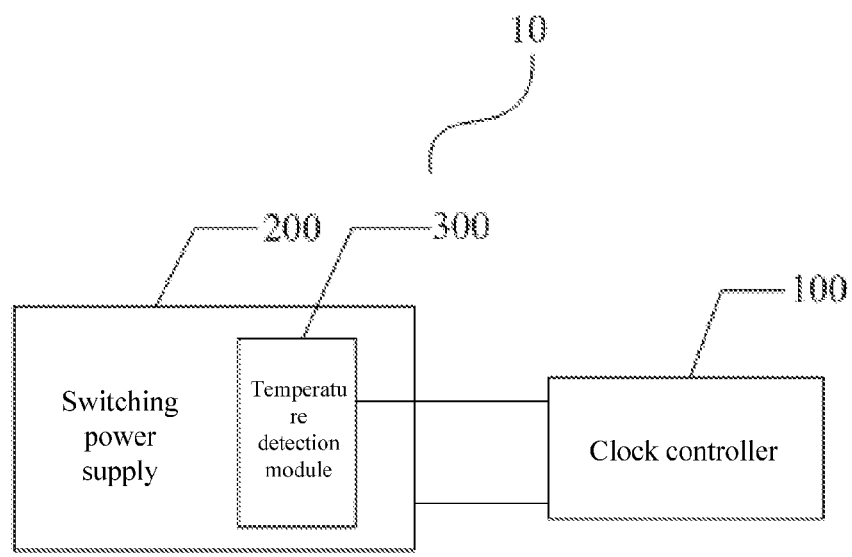
FIG. 2 illustrates a structural diagram of a driving apparatus of a display panel according to an embodiment of the present disclosure.

As shown in FIG. 2, a driving apparatus 10 of a display panel according to an embodiment of the present disclosure may include a clock controller 100 configured to is control a polarity inversion mode of displaying an image of the display panel and a switching power supply 200 configured to supply a voltage to the clock controller 100. The driving apparatus 10 further includes a temperature detection module 300 electrically connected to the clock controller 100. The temperature detection module 300 is configured to detect a temperature of the switching power supply 200 and compare the detected temperature of the switching power supply 200 with a preset temperature value. When the detected temperature of the switching power supply 200 is larger than or equal to the preset temperature value, a first control signal is transmitted to the clock controller 100. The clock controller 100 receives the first control signal, and switches the polarity inversion mode of displaying the image on the display panel from a first polarity inversion mode to a second polarity inversion mode according to the received first control signal. A power consumption of the switching power supply in the second polarity inversion mode is smaller than a power consumption of the switching power supply in the first polarity inversion mode.

As the driving apparatus 10 is provided with a temperature detection module for detecting a temperature of the switching power supply, the temperature of the switching power supply can be monitored by the driving apparatus in real time. When the temperature of the switching power supply is larger than or equal to the preset temperature value, the temperature detection module may feed back to the clock controller the first control signal indicating that the temperature of the switching power supply is larger than or equal to the preset temperature. The clock controller may switch the polarity inversion mode of displaying image on the display panel according to the received first control signal, i.e., switching the polarity inversion mode of the display image on the display panel from the first polarity inversion mode with a large power consumption to a second polarity inversion mode with a small power consumption, is thereby reducing the power consumption of the switching power supply and thus reducing the temperature of the switching power supply.

Figures 3A, 3B:
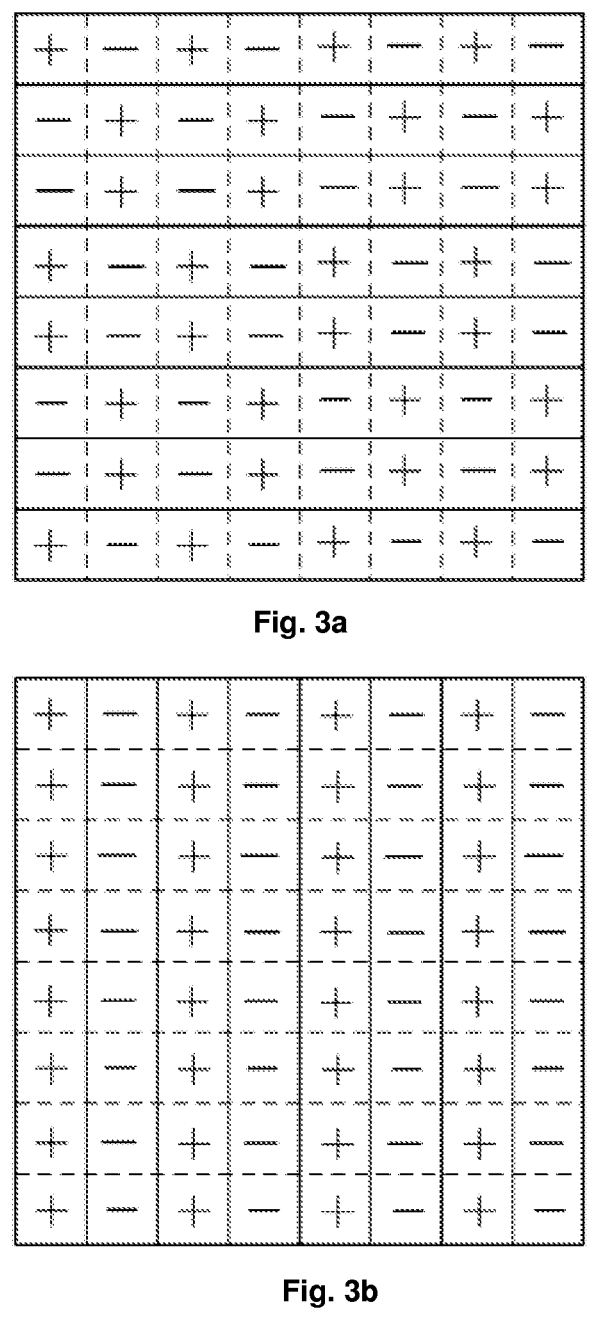

Specifically, in the above driving apparatus according to the embodiment of the present disclosure, the first polarity inversion mode is for example a 1+2dot mode (as shown in FIG. 3a). When the clock controller receives the first control signal, it indicates that the temperature of the switching power supply has exceeded the preset temperature value, and if the temperature of the switching power supply is not reduced, the switching power supply may be damaged. Therefore, the clock controller switches the polarity inversion mode of the display image on the display panel from for example the 1+2dot mode to a second polarity inversion mode such as a column inversion mode (as shown in FIG. 3b) or a 4dot mode according to the received first control signal. In this way, the power consumption required for the display picture is reduced, the current of the switching power supply is reduced, and thus the temperature of the switching power supply is reduced and the direct current power supply is protected. Those skilled in the art should understand that the present disclosure is only described by taking the 1+2dot mode as the first polarity inversion mode and the column inversion mode or 4dot mode as the second polarity inversion mode. As long as the first polarity inversion mode is switched to a second polarity inversion mode in which the power consumption of the switching power supply can be reduced, the polarity inversion modes belong to the scope of the embodiments of the present disclosure, and will not be limited herein.

Preferably, in order to ensure the quality of the picture displayed on the display panel, in the above driving apparatus according to the embodiments of the present disclosure, when the detected temperature of the switching power supply is smaller than the preset temperature value, the temperature detection module transmits a second control signal to the clock controller. The clock controller receives the second control signal, and enables the polarity inversion mode of the display image on the display panel to become the first polarity inversion mode. Thereby, when the temperature of the switching power supply does not exceed the preset temperature value, the clock controller controls to maintain the polarity inversion mode of displaying the image on the is display panel to be the first polarity inversion mode, thereby ensuring the quality of the picture displayed on the display panel.

Specifically, in an embodiment of the present disclosure, when receiving the second control signal, the clock controller determines whether the polarity inversion mode of displaying the image on the display panel is the first polarity inversion mode. If so, the clock controller maintains the polarity inversion mode to be the first polarity inversion mode. Otherwise, the clock controller switches the polarity inversion mode to the first polarity inversion mode.

Preferably, in order to detect the temperature of the switching power supply in real time, the temperature detection module may be integrated with the switching power supply.

Figure 4:
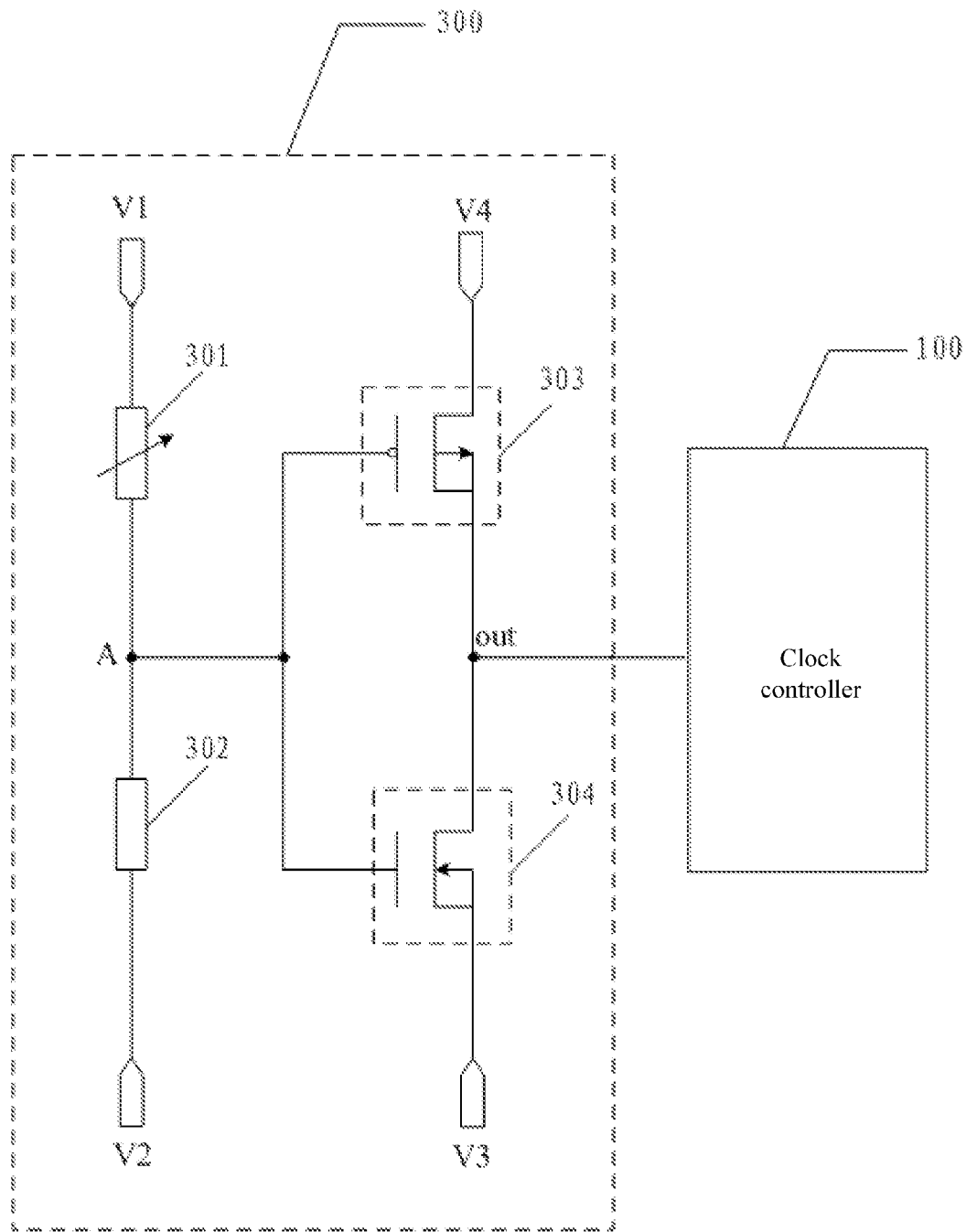
FIG. 4 illustrates a structural diagram of a temperature detection module in a driving apparatus according to an embodiment of the present disclosure.

Preferably, as shown in FIG. 4, the temperature detection module 300 may include a thermistor 301 configured to detect the temperature of the switching power supply; a resistor unit 302; a P type transistor 303; an N type transistor 304; a first voltage input terminal V1; a second voltage input terminal V2; a third voltage input terminal V3; a fourth voltage input terminal V4; and a control signal output terminal out connected to the clock controller 100.

A first terminal of the thermistor 301 is connected to the first voltage input terminal V1, a second terminal of the thermistor 301 is connected to a first terminal of the resistor unit 302, a gate electrode of the P type transistor 303 and a gate electrode of the N type transistor 304 respectively; and a second terminal of the resistor unit 302 is connected to the second voltage input terminal V2.

A source electrode of the N type transistor 304 is connected to the third voltage input terminal V3, a drain electrode of the N type transistor 304 is connected to the control signal output terminal out and a drain electrode of the P type transistor 303; and the source electrode of the P type transistor 303 is connected to the fourth voltage input terminal V4.

There is a voltage difference between the first voltage input terminal V1 and the second voltage input terminal V2, and there is a voltage difference between the third voltage input terminal V3 and the fourth voltage input terminal V4.

In operation, when the temperature of the switching power supply detected by the thermistor 301 is larger than or equal to the preset temperature value, a resistance value of the thermistor 301 is larger than or equal to a preset resistance value, and then the control signal output terminal out outputs a first control signal; and when the temperature of the switching power supply detected by the thermistor 301 is smaller than the preset temperature value, the resistance value of the thermistor 301 is smaller than the preset resistance value, and then the control signal output terminal out outputs a second control signal.

Preferably, in the above driving apparatus according to the embodiment of the present disclosure, the second voltage input terminal and/or the third voltage input terminal is connected to the ground.

Alternatively, preferably in the above driving apparatus according to the embodiment of the present disclosure, the first voltage input terminal and/or the fourth voltage input terminal is connected to the ground.

Specifically, the specific operating principle of the above temperature detection module will be described below by taking the second voltage input terminal and the third voltage input terminal being connected to the ground, a voltage value of the first voltage input terminal being 5V, and a voltage value of the fourth voltage input terminal being 3.3V as an example.

As shown in FIG. 4, assume that the preset temperature value of the temperature detection module 300 is $\chi$, and the resistance value of the thermistor unit 301 increases with the detected temperature of the switching power supply. When the temperature of the switching power supply detected by the thermistor unit 301 is lower than $\chi$, the resistance value of the thermistor is less than the corresponding preset resistance value, and a voltage value at point A is larger than or equal to 3.5V. At this time the N type transistor 304 is turned on and the P type transistor 303 is turned off. When the temperature of the thermistor unit 301 is higher than $\chi$, and the voltage value at point A is less than 3.5V. At this time the P type transistor 303 is turned on and the N type transistor 304 is turned off.

Therefore, when the temperature of the switching power supply 200 is low, the temperature of the switching power supply detected by the thermistor unit 301 is less than $\chi$, the resistance value of the thermistor unit 301 is small, for example, the resistance value of the thermistor unit is less than the preset resistance value, and a voltage at point A is larger than or equal to 3.5V. At this time, the P type transistor 303 is in an off state and the N type transistor 304 is in an on state. Therefore, a voltage value of a voltage signal output by the control signal output terminal out is equal to the voltage value of the third voltage input terminal, i.e., in the present example, the voltage value of the voltage signal output by the control signal output terminal out is equal to 0V. The voltage signal equal to 0V may be defined as the second control signal.

As the temperature of the switching power supply 200 increases, the temperature of the switching power supply detected by the thermistor unit 301 also gradually increases, which results in the resistance value of the thermistor unit 301 also gradually increasing and the voltage at point A gradually decreasing. When the temperature of the switching power supply detected by the thermistor unit 301 is larger than or equal to $\chi$, the resistance value of the thermistor is larger than or equal to the preset resistance value, and the voltage at point A decreases below 3.5V. At this time, the P type transistor 303 is in an on state, the N type transistor 304 is in an off state, and the voltage value of the voltage signal output by the control signal output terminal out is equal to the voltage value of the fourth voltage input terminal, i.e., the voltage value of the voltage signal output by the control signal output terminal out is equal to 3.3V, and the voltage signal with a voltage value equal to 3.3V is defined as the first control signal.

Figure 5:
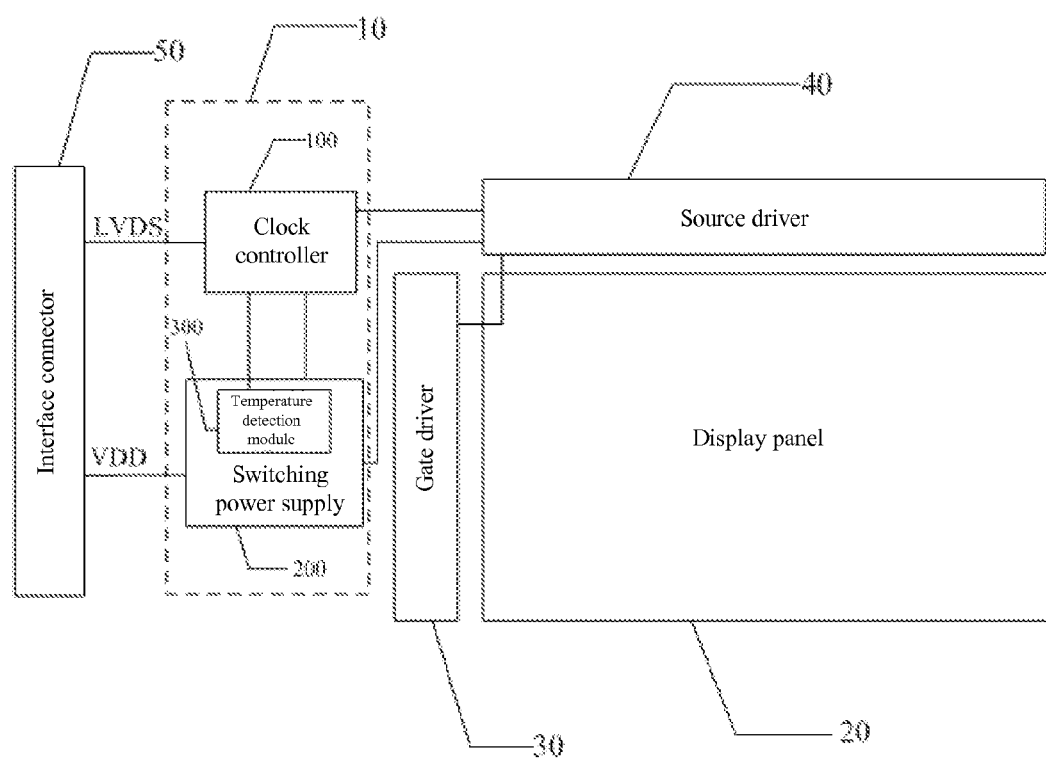
FIG. 5 illustrates a structural diagram of a display apparatus according to an embodiment of the present disclosure.

Based on the same inventive concept, the embodiments of the present invention further provide a display apparatus. As shown in FIG. 5, the display apparatus according to an embodiment of the present disclosure includes a display panel 20 and the driving apparatus 10 according to the embodiment of the present disclosure. The display apparatus may be a product or component having a display function and a touch function, such as a mobile phone, a tablet computer, a television, a display, a notebook computer, a digital photo frame, a navigating instrument etc. The display apparatus may be implemented with reference to the embodiments of the above driving apparatus of the display panel, and the repeated parts will not be described here.

As shown in FIG. 5, the display apparatus may further include a gate driver 30, a source driver 40 and an interface connector 50 to implement image display. Detailed description of the above well-known components will not be described here.

Further, in the above display apparatus according to the embodiment of the present disclosure, the display panel may be a liquid crystal display panel or an organic electroluminescent display panel, which will not be limited here.

The embodiments of the present disclosure provide a driving apparatus of a display panel and a display apparatus. As the driving apparatus is provided with a temperature detection module for detecting a temperature of the switching power supply, the temperature of the switching power supply can be monitored in real time. When the temperature of the switching power supply is larger than or equal to the preset temperature value, the temperature detection module feeds back to the clock controller a first control signal indicating that the temperature of the switching power supply is too high. The clock controller may switch a polarity inversion mode of displaying the image on the display panel according to the received first control signal, i.e., switching the polarity inversion mode of displaying the image on the display panel from the first polarity inversion mode with a large power consumption into a second polarity inversion is mode with a small power consumption, thereby reducing the power consumption of the switching power supply and thus reducing the temperature of the switching power supply.

Obviously, those skilled in the art can make various changes and variations to the present disclosure without departing from the spirit and scope of the present disclosure. If these changes and variations of the present disclosure belong to the scope defined by the appended claims, these changes and variations are also intended to be included in the present disclosure.

What is claimed is:

1. A driving apparatus of a display panel, comprising:
   a clock controller configured to control a polarity inversion mode of displaying an image on the display panel;
   a switching power supply configured to supply power to the clock controller; and
   a temperature detection module electrically connected to the clock controller and configured to detect a temperature of the switching power supply and compare the detected temperature of the switching power supply with a preset temperature value, and when the detected temperature of the switching power supply is larger than or equal to the preset temperature value, transmit a first control signal to the clock controller;
   wherein the clock controller is further configured to receive the first control signal, and switch the polarity inversion mode of displaying the image on the display panel from a first polarity inversion mode to a second polarity inversion mode according to the received first control signal, wherein a power consumption of the switching power supply in the second polarity inversion mode is smaller than a power consumption of the switching power supply in the first polarity inversion mode;
   wherein the temperature detection module comprises:
   a thermistor configured to detect the temperature of the switching power supply;
   a resistor unit;
   a P type transistor;
   an N type transistor;
   a first voltage input terminal;
   a second voltage input terminal;
   a third voltage input terminal;
   a fourth voltage input terminal; and
   a control signal output terminal connected to the clock controller; wherein,
   a first terminal of the thermistor is connected to the first voltage input terminal, a second terminal of the thermistor is connected to a first terminal of the resistor unit, a gate electrode of the P type transistor and a gate electrode of the N type transistor respectively; and a second terminal of the resistor unit is connected to the second voltage input terminal; and
   a source electrode of the N type transistor is connected to the third voltage input terminal, a drain electrode of the N type transistor is connected to the control signal output terminal and a drain electrode of the P type transistor; and a source electrode of the P type transistor is connected to the fourth voltage input terminal; and
   wherein, when the temperature of the switching power supply detected by the thermistor is larger than or equal to the preset temperature value, a resistance value of the thermistor is larger than or equal to a preset resistance value, and then the control signal output terminal outputs a first control signal; and when the temperature of the switching power supply detected by the thermistor is smaller than the preset temperature value, the resistance value of the thermistor is smaller than the preset resistance value, and then the control signal output terminal outputs a second control signal so as to switch the polarity inversion mode of displaying the image on the display panel from the second polarity inversion mode to the first polarity inversion mode.

2. The driving apparatus according to claim 1, wherein the temperature detection module is further configured to transmit a second control signal to the clock controller when the detected temperature of the switching power supply is smaller than the preset temperature value; and
   the clock controller is further configured to receive the second control signal, and enable the polarity inversion mode of displaying the image on the display panel to be the first polarity inversion mode.

3. The driving apparatus according to claim 2, wherein the clock controller is further configured to:
   determine whether the polarity inversion mode of displaying the image on the display panel is the first polarity inversion mode when receiving the second control signal; and
   if so, maintain the polarity inversion mode of the display image to be the first polarity inversion mode;
   otherwise, switch the polarity inversion mode of the display image to the first polarity inversion mode.

4. The driving apparatus according to claim 1, wherein the temperature detection module is integrated with the switching power supply.

5. The driving apparatus according to claim 1, wherein there is a voltage difference between the first voltage input terminal and the second voltage input terminal, and there is a voltage difference between the third voltage input terminal and the fourth voltage input terminal.

6. The driving apparatus according to claim 5, wherein the second voltage input terminal and/or the third voltage input terminal is connected to the ground.

7. The driving apparatus according to claim 5, wherein the first voltage input terminal and/or the fourth voltage input terminal is connected to the ground.

8. A display apparatus, comprising a display panel and the driving apparatus of the display panel according to claim 1.

9. The display apparatus according to claim 8, wherein the display panel is a liquid crystal display panel or an organic electroluminescent display panel.

* * * * *